(12) United States Patent
Wang (10) Patent No.: US 10,074,455 B2
(45) Date of Patent: Sep. 11, 2018

(54) AGGLOMERATE COMPOSITION

(71) Applicant: IMERYS PIGMENTS, INC., Roswell, GA (US)

(72) Inventor: Bo Wang, Lompoc, CA (US)

(73) Assignee: Imerys USA, Inc., Roswell, GA (US)

( * ) Notice: Subject to any disclaimer, the term of this patent is extended or adjusted under 35 U.S.C. 154(b) by 366 days.

(21) Appl. No.: 14/439,196

(22) PCT Filed: Oct. 30, 2013

(86) PCT No.: PCT/US2013/067416
§ 371 (c)(1),
(2) Date: Apr. 28, 2015

(87) PCT Pub. No.: WO2014/070839
PCT Pub. Date: May 8, 2014

(65) Prior Publication Data
US 2015/0302947 A1    Oct. 22, 2015

Related U.S. Application Data

(60) Provisional application No. 61/720,710, filed on Oct. 31, 2012, provisional application No. 61/784,699, filed on Mar. 14, 2013.

(51) Int. Cl.
*H01B 1/24* (2006.01)
*H01B 1/18* (2006.01)
(Continued)

(52) U.S. Cl.
CPC .............. *H01B 1/24* (2013.01); *C08K 9/08* (2013.01); *C09C 1/028* (2013.01); *C09C 1/28* (2013.01);
(Continued)

(58) Field of Classification Search
CPC .................................. H01B 1/18; H01B 1/24
See application file for complete search history.

(56) References Cited

U.S. PATENT DOCUMENTS 3,928,059 A * 12/1975 Ferrigno ............... C09C 1/28
106/462
4,388,103 A * 6/1983 Purdum ............... A01N 57/20
504/202

(Continued)

FOREIGN PATENT DOCUMENTS

WO    WO 2014/070839 A1    5/2014

OTHER PUBLICATIONS

International Search Report and Written Opinion dated Feb. 21, 2014, in International Application No. PCT/US2013/067416.

*Primary Examiner* — Peter F Godenschwager
(74) *Attorney, Agent, or Firm* — Finnegan, Henderson, Farabow, Garrett & Dunner LLP (57) ABSTRACT

A talc agglomerate composition may include agglomerated talc particles and an agglomerization agent, and may have a conductivity of from about 1 to about 50 µS/cm. A method for making a talc agglomerate composition may include agglomerating talc particles by combining a talc feed material including talc particles and an agglomerization agent to form a talc agglomerate composition. The talc agglomerate composition may have a $d_{10}$ greater than a $d_{10}$ of the talc feed material including talc particles. A talc composition may include talc particles having a conductivity greater than 8.1 µS/cm and a viscosity in oil of less than 140 KU.

11 Claims, 3 Drawing Sheets

(51) Int. Cl.
    *C08K 9/08*           (2006.01)
    *C09C 1/02*           (2006.01)
    *C09C 1/28*           (2006.01)
    *C09D 5/00*           (2006.01)
    *C09D 5/16*           (2006.01)
    *C09D 163/00*        (2006.01)
    *C09D 7/62*           (2018.01)
    C09C 3/04           (2006.01)

(52) U.S. Cl.
    CPC ............. *C09D 5/00* (2013.01); *C09D 5/1687* (2013.01); *C09D 7/62* (2018.01); *C09D 163/00* (2013.01); *H01B 1/18* (2013.01); *C01P 2004/51* (2013.01); *C01P 2004/53* (2013.01); *C01P 2004/61* (2013.01); *C01P 2006/40* (2013.01); *C09C 3/045* (2013.01)

(56) References Cited

U.S. PATENT DOCUMENTS

| | | |
|---|---|---|
| 5,827,917 A | 10/1998 | Fourty |
| 5,844,037 A | 12/1998 | Lundgard et al. |
| 7,199,173 B2 | 4/2007 | Shimizu et al. |
| 2011/0061568 A1 | 3/2011 | Fiedler et al. |

\* cited by examiner

AGGLOMERATE COMPOSITION

CLAIM FOR PRIORITY

This application is a U.S. national stage entry under 35 U.S.C. § 371 from PCT International Application No. PCT/US2013/067416, filed Oct. 30, 2013, which claims priority to and the benefit of the filing dates of U.S. Provisional Application Nos. 61/784,699, filed Mar. 14, 2013, and 61/720,710, filed Oct. 31, 2012, the subject matter of all of which is incorporated herein by reference.

TECHNICAL FIELD

The present invention is directed to talc agglomerate compositions, to methods for making a talc agglomerate composition, to uses thereof, and to a functional composition comprising said talc agglomerate composition.

BACKGROUND OF THE INVENTION

Talc is a mineral composed of hydrated magnesium silicate. It uses are many and various. Talc is used in many industries such as paper making, plastic, paint and coatings, rubber, food, electric cable, pharmaceuticals, cosmetics and ceramics. As a raw material for industry it is typically provided in the form of a fine powder. However, the ultrafine portion of the powder can complicate further processing and/or render the raw material unsuitable for some applications. It would be desirable to provide a talc material with less fines without necessarily having to resort to costly processing of the mined talc material. In addition, it is desirable to provide a talc agglomerate composition, optionally with less fines than the talc feed material, which has a conductivity which is similar to the conductivity of the talc feed material. This is particularly, but not exclusively, desired for marine and protective coating applications.

SUMMARY OF THE INVENTION

In accordance with a first aspect of the present invention, there is provided a talc agglomerate composition, said composition comprising agglomerated talc particles and an agglomerization agent, and having a $d_{10}$ of from about 0.75 to about 20 µm.

In accordance with a second aspect of the present invention, there is provided a talc agglomerate composition comprising talc agglomerates, each comprising two or more talc particles attached together; and an agglomerization agent. The talc agglomerate composition has a $d_{10}$ of from about 0.75 to about 20 µm.

In accordance with a third aspect of the present invention, there is provided a method for making a talc agglomerate composition, said method comprising agglomerating talc particles by combining a talc feed material comprising talc particles and an agglomerization agent to form a talc agglomerate composition, wherein the talc agglomerate composition has:
 (i) a $d_{10}$ which is greater than a $d_{10}$ of the talc feed material comprising talc particles; and/or
 (ii) a $d_{50}$ which is greater than a $d_{50}$ of the talc feed material comprising talc particles; and/or
 (iii) a $d_{90}$ which is greater than, or substantially unchanged compared to, a $d_{90}$ of the talc feed material; and/or
 (iv) a $d_{95}$ which is greater than, or substantially unchanged compared to, a $d_{95}$ of the talc feed material; and/or
 (v) a $d_{100}$ which is greater than, or substantially unchanged compared to, a $d_{100}$ of the talc feed material.

In accordance with a fourth aspect of the present invention, a talc agglomerate composition obtainable by the method of the third aspect of the present invention is provided.

In accordance with a sixth aspect of the present invention, use of a talc agglomerate composition according to the first, second or fourth aspects of the present invention as a filler in a functional composition is provided.

In accordance with a seventh aspect of the present invention, there is provided a functional composition comprising a talc agglomerate composition according to the first, second or fourth aspects of the present invention.

In accordance with an eighth aspect of the present invention, there is provided a talc agglomerate composition comprising agglomerated talc particles and an agglomerization agent, and having a conductivity of from about 1 to about 50 µS/cm.

In accordance with a ninth aspect of the present invention, there is provided a talc agglomerate composition comprising talc agglomerates, each comprising two or more talc particles attached together; and an agglomerization agent; wherein said talc agglomerate composition has a conductivity of from about 1 to about 50 µS/cm.

In accordance with a tenth aspect of the present invention, there is provided a talc agglomerate composition comprising agglomerated talc particles and an agglomerization agent, wherein said agglomerization agent comprises a non-electrolytic binder.

In accordance with an eleventh aspect of the present invention, there is provided a talc agglomerate composition comprising talc agglomerates, each comprising two or more talc particles attached together; and an agglomerization agent; wherein said agglomerization agent comprises a non-electrolytic binder.

In accordance with a twelfth aspect of the present invention, there is provided the method of the third aspect of the present invention, wherein the talc agglomerate composition has a conductivity of from about 1 to about 50 µS/cm.

In accordance with a thirteenth aspect of the present invention, there is provided the method of the third aspect of the present invention, wherein the agglomerization agent comprises a non-electrolytic binder.

In accordance with a fourteenth aspect of the present invention, there is provided a talc agglomerate composition obtainable by the method of the twelfth aspect or the thirteenth aspect of the present invention.

In accordance with a fifteenth aspect of the present invention, use of a talc agglomerate composition according to the eighth, ninth, tenth, eleventh or fourteenth aspect of the present invention as a filler in a functional composition is provided.

In accordance with a sixteenth aspect of the present invention, there is provided a functional composition comprising the talc agglomerate composition of any one of the eighth, ninth, tenth, eleventh and fourteenth aspects of the present invention.

The details, examples and preferences provided in relation to any particular one or more of the stated aspects of the present invention apply equally to all aspects of the present invention.

DETAILED DESCRIPTION OF THE INVENTION

Talc Agglomerate Composition
Particle Size Distribution

The talc agglomerate composition of the first and second aspects of the present invention has a $d_{10}$ of from about 0.75 to about 20 μm. In certain embodiments, the talc agglomerate composition has a $d_{50}$ of from about 5 to about 30 μm and/or a $d_{90}$ of from about 15 to about 50 μm and/or a $d_{95}$ of from about 20 to about 70 μm. In certain embodiments, the talc agglomerate composition has a $d_{50}$ of from about 5 to about 30 μm, a $d_{90}$ of from about 15 to about 50 μm, and a $d_{95}$ of from about 20 to 70 μm.

The talc agglomerate composition of the eighth, ninth, tenth, eleventh and fourteenth aspects of the present invention may have a $d_{10}$ of from about 0.75 to about 20 μm. In certain embodiments, the talc agglomerate composition may have a $d_{50}$ of from about 5 to about 30 μm and/or a $d_{90}$ of from about 15 to about 50 μm and/or a $d_{95}$ of from about 20 to about 70 μm. In certain embodiments, the talc agglomerate composition may have a $d_{50}$ of from about 5 to about 30 μm, a $d_{90}$ of from about 15 to about 50 μm, and a $d_{95}$ of from about 20 to 70 μm.

Unless otherwise stated, the particle size properties referred to herein for the talc agglomerate composition and talc feed material are as measured by the well known conventional method employed in the art of laser light scattering, using a Leeds and Northrup Microtrac X100 laser particle size analyzer (Leeds and Northrup, North Wales, Pa., USA), which can determine particle size distribution over a particle size range from 0.12 μm to 704 μm. (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. The $d_{10}$ value is the value at which 10% by volume of the particles have an esd less than that $d_{10}$ value. The $d_{90}$ value is the value at which 90% by weight of the particles have an esd less than that $d_{90}$ value. The $d_{95}$ value is the value at which 95% by volume of the particles have an esd less than that $d_{95}$ value. The $d_{100}$ value is the value at which 100% by volume of the particles have an esd less than that $d_{100}$ value. The $d_0$ value is the value at which 0% by volume of the particles have an esd less than that $d_0$ value. Thus, the $d_0$ measurement provides a measure of the smallest particles in any given sample (within the limits of measurement of the particle size analyzer).

In certain embodiments, the talc agglomerate composition has a $d_{10}$ of from about 1 to about 15 μm, for example, from about 1 to about 12 μm, or from about 1 to about 10 μm, or from about 2 to about 15 μm, or from about 2 to about 12 μm, or from about 2 to about 10 μm, or from about 3 to about 15 μm, or from about 3 to about 12 μm, or from about 3 to about 10 μm, or from about 5 to about 15 μm, or from about 5 to about 12 μm, or from about 5 to about 10 μm, or from about 7 to about 15 μm, or from about 7 to about 12 μm, or from about 7 to about 10 μm.

In certain embodiments, the talc agglomerate composition has a $d_{50}$ of from about 5 to about 30 μm, for example, from about 10 to about 30 μm, or from about 15 to about 30 μm, or from about 18 to about 27 μm, or from about 15 to about 25 μm, or from about 18 to about 22 μm.

In certain embodiments, the talc agglomerate composition has a $d_{90}$ of from about 15 to about 50 μm, for example, from about 25 to about 45 μm, or from about 30 to about 45 μm, or from about 32 to about 40 μm, or from about 35 to about 45 μm, or from about 35 to about 40 μm.

In certain embodiments, the talc agglomerate composition has a $d_{95}$ of from about 20 to about 70 μm, for example, from about 20 to about 60 μm, or from about 30 to about 55 μm, or from about 35 to about 50 μm, or from about 40 to about 50 μm, or from about 42 to about 47 μm.

In certain embodiments, the talc agglomerate composition has a $d_{10}$ of from about 5 to about 15 μm and a $d_{50}$ of from about 10-30 μm, for example, from about 15 to 30 μm. The $d_{90}$ may be from about 30-45 μm and the $d_{95}$ may be from about 35 to about 60 μm.

In certain embodiments, the talc agglomerate composition has a $d_{10}$ of from about 5 to about 15 μm, a $d_{50}$ of from about 10-30 μm, for example, from about 15 to 30 μm, and a $d_{90}$ of from about 30-45 μm. The $d_{95}$ may be from about 35 to about 60 μm.

In certain embodiments, the talc agglomerate composition has a $d_{10}$ of from about 5 to about 15 μm, a $d_{50}$ of from about 10-30 μm, for example, from about 15 to 30 μm, and a $d_{95}$ from about 35 to about 60 μm. The $d_{90}$ may be from about 30-45 μm.

In certain embodiments, the talc agglomerate composition has a $d_{10}$ of from about 5 to about 15 μm, a $d_{50}$ of from about 10-30 μm, for example, from about 15 to 30 μm, a $d_{90}$ of from about 30-45 μm and a $d_{95}$ from about 35 to about 60 μm.

In certain embodiments, the talc agglomerate composition has a $d_{10}$ of from about 5 to about 15 μm and a $d_{95}$ of from about 35 to about 60 μm. The $d_{50}$ may be from about 10 to about 30 μm, for example, from about 15 to about 30 μm, and the $d_{90}$ may be from about 30 to about 45 μm.

In certain embodiments, the talc agglomerate composition has a $d_{10}$ of from about 5 to about 15 μm, a $d_{95}$ of from about 35 to about 50 μm and a $d_{90}$ from about 30 to about 45 μm. The $d_{50}$ may be from about 10 to about 30 μm, for example, from about 15 to about 30 μm.

In certain embodiments, the talc agglomerate composition has a $d_{10}$ of from about 5 to about 15 μm and a $d_{90}$ of from about 30 to about 45 μm. The $d_{50}$ may be from about 10 to about 30 μm, for example, from about 15 to about 30 μm, and the $d_{95}$ may be from about 35 to about 60 μm.

In certain embodiments, the talc the talc agglomerate composition has a $d_{10}$ of from about 5 to about 15 μm, a $d_{90}$ of from about 30 to about 45 μm and a $d_{95}$ from about 35 to about 60 μm. The $d_{50}$ may be from about 10 to about 30 μm, for example, from about 15 to about 30 μm.

In certain embodiments, the talc agglomerate composition has a Hegman fineness of 3.0 or more, for example, from about 3.0 to about 4.5, or from about 3.0 to about 4.25, or from about 3.0 to about 4.0. In certain embodiments, the talc agglomerate composition has a Hegman fineness of about 3.0, or about 3.25, or about 3.5, or about 3.75, or about 4.0, or about 4.25, or about 4.5.

In certain other embodiments, the talc agglomerate composition has a Hegman fineness of 0.5 or more, for example from about 0.5 to about 4.5, or from about 0.5 to about 3.25. In certain other embodiments, the talc agglomerate composition has a Hegman fineness of about 0.5, or about 0.75, or about 1.0, or about 1.25, or about 1.75, or about 2.0, or about 2.5, or about 2.75, or about 3.0, or about 3.25.

In certain embodiments, the talc agglomerate composition has a Hegman fineness which is within the range of ±1 of the Hegman fineness of the talc feed material from which the talc agglomerate composition is prepared, for example, within the range of ±0.5 or, for example, within the of ±0.25 of the Hegman fineness of the talc feed material. The test for measuring Hegman fineness is based on a ASTM D-1210-05 (2010). In a preferred method, 25 g of vegetable oil are provided. After adding 5 g sample, the mixture is kept stirring for 15 to 30 seconds. When no dry powder is visually present, mixing speed is increase to the highest reasonable speed without splashing the sample and mixing is continued for at least 2 minutes. Using a spatula or glass rod, the dispersion is stirred manually. A small amount of dispersed sample is placed in the deep end of the path of the Hegman fineness gage (Precision Gage & Tool Co., Dayton, Ohio). By using a steel draw-down blade/scraper, the material is then drawn down the length of the path toward the shallow end of the gage with a uniform, brisk motion. The fineness reading, in Hegman units (0-8) is obtained by observing the point where the material first shows a definite speckled pattern. Typical fineness patterns described in the ASTM D 1210-05 (2010) procedure can be used for comparison.

The standard deviation (sd) of the particle size distribution can be used as a specified width of the measured particle size distribution. In particular it subtracts the size of particles comprising the finest 16% of the volume from the size that comprises 84% of the volume, and divides that number by 2. Both values may be calculated from the particle size instrument's algorithms, and are discussed in detail in the instrument's documentation (Leeds and Northrop, Operator's Manual, 1993). The ratio of standard deviation to mean particle size (i.e., $sd/d_{50}$) reflects the relative tightness of the particle size distribution. Thus, in certain embodiments the talc agglomerate composition has a $sd/d_{50}$ of from about 0.3 to less than about 1.0, for example, from about 0.4 to about 0.9, or from about 0.4 to about 0.8, or from about 0.5 to about 0.7, or from about 0.5 to about 0.7.

In certain embodiments, the talc agglomerate composition has a $d_{100}$ of from about 70 µm to about 200 µm, for example, from about 80 to 150 µm, or from 80 µm to about 135 µm, of from 80 to about 120 µm, or from about 80 to about 110 µm, or from about 80 to about 100 µm, or from about 80 to about 90 µm, or from about 85 to about 110 µm, or from about 85 to 100 µm, or from about 85 to about 90 µm.

In certain embodiments, the talc agglomerate composition has a $d_0$ of from about 0.75 to about 5.0 µm, for example, a $d_0$ of 1.0 µm, or 1.25 µm, or 1.5 µm, or 1.75 µm, or 2.0 µm, or 2.25 µm, or 2.5 µm, or 2.75 µm, or 3.0 µm, or 3.25 µm, or 3.5 µm, or 3.75 µm, or 4.0 µm, or 4.25 µm, or 4.5 µm, or 4.75 µm, or 5.0 µm.

Conductivity

When the talc agglomerate composition has a conductivity of from about 1 to about 50 µS/cm, in certain embodiments it may have a conductivity of from about 5 to about 45 µS/cm, for example from about 5 to about 40 µS/cm or from about 5 to about 35 µS/cm. In certain embodiments, the talc agglomerate composition has a conductivity of from about 5 to about 30 µS/cm, for example from about 5 to about 25 µS/cm. In some embodiments, the talc agglomerate composition has a conductivity of from about 7 to about 35 µS/cm, for example from about 7 to about 30 µS/cm or from about 7 to about 25 µS/cm. In other embodiments, the talc agglomerate composition has a conductivity of from about 7 to about 23 µS/cm, for example from about 7.5 to about 22.5 µS/cm.

Unless otherwise stated, the conductivity properties of the talc agglomerate compositions are measured by the method described in Example 5 using a Fisher Scientific Accumet Model 20 pH/conductivity meter, available from Fisher Scientific UK Limited, Loughborough, UK. Talc agglomerate compositions were prepared by dispersing binder in water at room temperature in the quantities specified in the examples, and then slowly adding the resultant mixture to 250 g of feed talc in a food mixer. After mixing for 15 minutes, the mixture was dried in a 150° C. oven overnight and was then brushed through 200 mesh screen with a 74 micron opening. The conductivity of the talc agglomerate compositions, talc feed material and talc control material was measured using the Fisher Scientific Accumet Model 20 pH/conductivity meter. Samples were prepared by adding 5 g of the talc agglomerate composition, talc feed material or talc control material to 20 ml of distilled water and stirring for about one minute using a magnetic stirrer. 80 ml of water was then added to the solution and stirred for 30 seconds before the conductivity measurement was taken.

In certain embodiments, the conductivity of the talc agglomerate compositions of the present invention is substantially similar to the conductivity of the talc feed material and/or a talc control material which is a talc feed material from which the fines have been removed to simulate the fines content of the talc agglomerate material (in order to control out any conductivity modulating effect of the fines). When a non-electrolytic binder is present, it is preferred that the talc agglomerate compositions have a conductivity which is substantially similar to that of the feed material. Alternatively or additionally, the talc agglomerate compositions of the present invention may have a conductivity which is substantially similar to that of the control material. The phrase "substantially similar" means that the conductivity of certain embodiments of the talc agglomerate compositions of the present invention differs from the conductivity of the talc feed material or talc control material by no more than about 30%. For example, the conductivity of the talc agglomerate composition may differ from the conductivity of the talc feed material or talc control material by no more than about 25%, for example no more than about 20%, for example no more than about 15%, for example no more than about 10%, for example no more than about 5%.

Agglomerization Agent

The talc agglomerate compositions of the present invention comprise an agglomerization agent. As used herein, the term "agglomerization agent" means any suitable chemical entity which when combined with a talc feed material comprising talc particles causes two or more particles of talc in the feed material to become attached, interconnected or otherwise bonded together.

The agglomerization agent has the effect of increasing the mean particle size ($d_{50}$) of the feed material. Advantageously, the agglomerization agent may selectively agglomerate relatively fine or ultra fine talc particles in the feed material. The resultant talc agglomerate composition will have a larger $d_{10}$ and mean particle size ($d_{50}$) than the talc feed material and a $d_{100}$ which may be substantially unchanged compared to the talc feed material. By "substantially unchanged" means that the percent volume of particles with a particular e.s.d. of the talc agglomerate composition is no more than about 5% greater than that of the talc feed material. For example, a talc feed material may have a $d_{100}$ of 100 µm and the talc agglomerate composition formed therefrom may have a $d_{50}$ of 104 µm. Thus, in this example, the $d_{100}$ of the talc agglomerate composition is 4% greater than the $d_{100}$ of the talc feed material.

In certain embodiments, the agglomerization agent is a binder composition. For example, an organic or inorganic binder composition. The binder composition may be selected from one or more of an organic or inorganic polymeric binder, a cementitious binder, alcohol-based binder, starch-based binder, cellulose-based binder, acrylic binder or silicate binder.

Cementitious binders include, but are not limited to, one or more of calcium aluminate, calcium silicate, colloidal alumina suspension, colloidal silica suspension, polysaccharide-based water soluble polymers and hydratable alumina.

In certain embodiments, the binder is an alcohol-based binder. By "alcohol" is meant an organic compound in which a hydroxyl functional group (—OH) is bonded to a carbon atom. An alcohol-based binder is therefore a composition or compound which contains a hydroxyl functional group bonded to a carbon atom, which is capable of functioning as an agglomerization agent.

The alcohol-based binder may comprise a primary alcohol having the general formula RCH$_2$OH, a secondary alcohol having the general formula RR'CHOH, a tertiary alcohol having the general formula RR'R"COH, or a combination thereof. R, R', and R" stand for alkyl groups having from one to twenty carbon atoms.

The alcohol-based binder may comprise primary, secondary and/or tertiary alcohol groups, which may be attached to a polymer backbone.

In an embodiment, the alcohol-based binder is a polymer comprising a carboniferous backbone having hydroxyl functional groups appended therefrom. Advantageously, in one embodiment the polymer is polyvinyl alcohol. Polyvinyl alcohol may be obtained by conventional methods know in the art, such as, for example by partial or complete hydrolysis of polyvinyl acetate to remove acetate groups. Thus, a person of skill in the art will understand that polyvinyl alcohol obtained by hydrolysis of polyvinyl acetate may contain pendant acetate groups as well as pendant hydroxy groups. Thus, in certain embodiments, the polyvinyl alcohol is derived from partially or fully hydrolysed polyvinyl acetate. The extent of hydrolysis may be such that at least about 50 mole % of the acetate groups are hydrolysed, for example, at least about 60 mole % of the acetate groups are hydrolysed, for example, at least about 70 mole % of the acetate groups are hydrolysed, for example, at least about 80 mole % of the acetate groups are hydrolysed, for example, at least about 85 mole % of the acetate groups are hydrolysed, for example, at least about 90 mole % of the acetate groups are hydrolysed, for example, at least about 95 mole % of the acetate groups are hydrolysed or, for example, at least about 99 mole % of the acetate groups are hydrolysed. In another embodiment, the polymer is a copolymer of polyvinyl alcohol and other monomers, such as, for example, acetate and acrylate.

In certain advantageous embodiments, the binder is a silicate binder, for example, an alkali metal or alkali earth metal silicate binder. In an embodiment, the alkali metal silicate binder is sodium silicate, potassium silicate, or a combination thereof. In certain embodiments, the silicate binder is sodium silicate. In certain embodiments, the silicate binder is potassium silicate. In another embodiment, the alkali earth metal silicate binder is magnesium silicate, calcium silicate, strontium silicate, barium silicate, or a combination thereof. In other embodiments, the silicate binder is a combination of alkali metal silicate binder and alkali earth metal silicate binder, for example, a combination of sodium silicate and/or potassium silicate and one or more of magnesium silicate, calcium silicate, strontium silicate and barium silicate.

It has been found that agglomerization agents comprising a non-electrolytic binder are particularly advantageous. When agglomerization agents comprising a non-electrolytic binder are used in certain embodiments of the present invention, the conductivity of the talc agglomerate compositions can be lower than the conductivity of talc agglomerate compositions using electrolytic binders. In certain advantageous embodiments, the conductivity of the talc agglomerate compositions is substantially similar to the conductivity of the talc feed materials and talc control materials as referred to above. This is particularly advantageous for marine and protective coating applications.

Therefore, in certain embodiments, the binder may be a non-electrolytic binder. In certain embodiments the binder may be inorganic non-electrolytic binders or organic non-electrolytic binders.

In certain embodiments, the non-electrolytic binder may be a polymer. A polymer is a compound consisting of a number of repeating structural units known as monomers. The polymer may consist of only one monomer (homopolymer) or two or more monomers (copolymer). Where the polymer is a copolymer, the polymer may be, for example, an alternating copolymer, a periodic copolymer or a block copolymer. The polymer may contain side chains, such as in a graft copolymer, for example.

In certain embodiments, the polymer may comprise a monomer which has a side group comprising a carbonyl, carboxyl, amino or amide functional group. The amino or amide functional group may be a primary, secondary or tertiary amino or amide group.

In particular embodiments, the binder may be selected from one or more polymers of one or more monomers selected from carboxylic acids and alkoxides, one or more polymers of N-vinylpyrrolidone, one or more other non-cationic or anionic polymers, or any combination or mixture thereof. In one embodiment, the binder is selected from the group comprising polyacrylic acid, polymethacrylic acid, polyvinylpyrrolidone, polyacrylamide, polymethacrylamide, and any combination or mixture thereof. Polyvinylpyrrolidone having a molecular weight in the range of about 50,000 to about 1.5 million may suitably be used, for example about 1.3 million. The polyacrylamide may, for example, be neutral or anionic.

In a further embodiment, the binder may be a non-electrolytic silicate binder, for example an alkyl silicate binder, for example an alkyl silicate binder containing from 1 to about 8 carbon atoms in the alkyl portion. In one embodiment, the non-electrolytic binder composition is ethyl silicate, which may, for example, be used in any suitable form including monomeric, oligomeric or cyclic forms or any combination or mixture thereof. Where a mixture of monomeric, oligomeric and cyclic forms of ethyl or other alkyl silicate are used, the average chain length may suitably be in the range of about 3 to about 8, for example about 5 Si—O units.

In certain embodiments, the agglomerization agent may comprise water. In one embodiment the agglomerization agent is water. The water may, for example, be deionised water.

In certain embodiments, the agglomerization agent may be selected from water, one or more of the aforementioned binders and mixtures thereof.

Viscosity and Bulk Density

It has been found that by increasing the fine particle size of the talc feed material by selective agglomeration the viscosity in oil of the agglomerized talc feed material, i.e., the talc agglomerate composition, decreases. Thus, in certain embodiments, the talc agglomerate composition of the present invention has a lower viscosity in oil compared to the viscosity in oil of the talc feed material from which the talc agglomerate is prepared. Viscosity in oil may be determined in accordance with the following method. 40 g or 100 g of the sample (i.e., talc agglomerate composition or talc feed material) is mixed in 140 g of vegetable oil at a speed of 1500 rpm for 5 minutes. The viscosity (in Kreb units, KU) of the resultant mixture is the measured using a BYK Gardner KU-1+Viscometer. The upper limit for this instrument is 140 KU.

In certain embodiments, the viscosity in oil (for 100 g loading in 140 g vegetable oil) of the talc agglomerate composition may be at least about 10% lower than the viscosity in oil of the talc feed material from which talc agglomerate composition it is prepared, for example, about 15% lower, or at least about 15% lower, or at least about 15% lower, or at least about 20% lower, or at least about 25% lower, or at least about 30% lower, or at least about 35% lower, or at least about 40 lower. In certain embodiments, the viscosity in oil of the talc agglomerate composition is no more than about 50% lower than the viscosity in oil of the talc feed material from which talc agglomerate composition it is prepared.

In certain embodiments, the talc agglomerate composition has a viscosity in oil of from 90 to 50 KU (for 100 g loading in 140 g vegetable oil), for example, a viscosity in oil of from about 80 to 50 KU, or from about 80 to 60 KU, or from about 80 to 70 KU, or from about 70 to 60 KU, or from about 75 to about 65 KU, or from about 75 to about 70 KU.

In certain embodiments, the talc agglomerate composition has a viscosity in oil of from 50 to 150 KU (for 200 g loading in 150 g vegetable oil), for example, a viscosity in oil of from about 95 to about 140 KU, or from about 95 to about 130 KU, or from about 98 to about 125 KU, or from about 100 to 120 KU.

Agglomerization of the talc feed material may have the effect of increasing bulk density. Thus, in certain embodiments, the talc agglomerate composition has a Tapped Bulk Density and/or a Loose Bulk Density which is greater compared to the Tapped Bulk Density and/or Loose Bulk Density of the talc feed material from which the talc agglomerate composition is prepared. Tapped Bulk Density and Loose Bulk Density test methods are based on ASTM D7481-09 (Standard Test Methods for Determining Loose and Tapped Bulk Densities of Powders using a Graduated Cylinder).

In certain embodiments, the talc agglomerate composition has a Loose Bulk Density of at least about 20 lbs/ft$^3$, for example, a least about 25 lbs/ft$^3$, or at least about 30 lbs/ft$^3$, or at least about 35 lbs/ft$^3$, or at least about 40 lbs/ft$^3$. In certain embodiments, the talc agglomerate composition has a Loose Bulk Density of no greater than about 60 lbs/ft$^3$, for example, no greater than about 50 lbs/ft$^3$, or no greater than about 45 lbs/ft$^3$.

In certain embodiments, the talc agglomerate composition has a Tapped Bulk Density of at least about 45 lbs/ft$^3$, for example, a least about 50 lbs/ft$^3$, or at least about 55 lbs/ft$^3$, or at least about 60 lbs/ft$^3$, or at least about 65 lbs/ft$^3$. In certain embodiments, the talc agglomerate composition has Tapped Bulk Density of no greater than about 100 lbs/ft$^3$, for example, no greater than about 80 lbs/ft$^3$, or no greater than about 70 lbs/ft$^3$.

Based on the total dry weight of the talc agglomerate composition, the talc agglomerate composition may comprise from about 60 to about 99% by weight talc, for example, from about 70 to about 99% by weight talc, or from about 75 to about 99% by weight talc, or from about 80 to about 99% by weight talc, or from about 85 to about 99% by weight talc, or from about 75 to about 95% by weight talc, or from about 80% to about 95% by weight talc, or from about 85 to about 95% by weight talc, or from about 80 to about 90% by weight talc, or from about 75 to about 90% by weight talc, or from about 75 to about 85% by weight talc.

The talc may be a natural or synthetic talc. The talc may be a macro or microcrystalline talc. The talc may, for example, be a chloritic talc or another mineral mixture which contains talc. For example, chloritic talc may comprise chlorite in the majority, or alternatively the chlorite component may be in a relative minority compared with the talc.

Preparative Methods

In accordance with the third aspect of the present invention, the talc agglomerate composition is made by a method comprising agglomerating talc particles by combining a talc feed material comprising talc particles and an agglomerization agent. The resultant talc agglomerate composition has:

(i) a $d_{10}$ which is greater than a $d_{10}$ of the talc feed material comprising talc particles; and/or (ii) a $d_{50}$ which is greater than a $d_{50}$ of the talc feed material comprising talc particles; and/or (iii) a $d_{90}$ which is greater than, or substantially unchanged compared to, a $d_{90}$ of the talc feed material; and/or (iv) a $d_{95}$ which is greater than, or substantially unchanged compared to, a $d_{95}$ of the talc feed material; and/or (v) a $d_{100}$ which is greater than, or substantially unchanged compared to, a $d_{100}$ of the talc feed material.

In accordance with the twelfth aspect of the present invention, there is provided a method for making talc agglomerate compositions in accordance with the third aspect of the present invention, wherein the conductivity of the talc agglomerate composition is from about 1 to about 50 µS/cm.

The conductivity of the talc agglomerate composition may be as discussed above in relation to certain embodiments of the talc agglomerate compositions of the present invention.

In accordance with the thirteenth aspect of the present invention, there is provided a method for making talc agglomerate compositions in accordance with the third aspect of the present invention, wherein the agglomerization agent comprises a non-electrolytic binder composition.

The non-electrolytic binder composition used in the thirteenth aspect of the present invention may be as discussed above in relation to certain embodiments of the talc agglomerate compositions of the present invention.

Particle Size Distribution

In certain embodiments, the $d_{10}$ and $d_{50}$ of the talc agglomerate composition is at least about 5% greater than the $d_{10}$ and $d_{50}$ of the talc feed material, for example, at least about 10% greater, or at least about 20% greater, or at least about 30% greater, or at least about 40% greater, or at least about 50% greater, or at least about 60% greater, or at least about 70% greater, or at least about 80% greater or at least about 90% greater, or at least about 100% greater. It will be understood by persons skilled in the art that a talc agglomerate composition having a $d_{10}$ value which is at least 100% greater than a $d_{10}$ of the feed material from which the talc agglomerate composition is prepared means that the $d_{10}$ value (in microns) of the talc agglomerate is at least about twice the $d_{10}$ value (in microns) of the talc feed material.

In certain embodiments, the $d_{10}$ of the talc agglomerate composition is at least about 125% greater than the $d_{10}$ of the talc feed material, for example, at least about 150% greater, or at least about 175% greater, or at least about 200% greater, or at least about 225% greater, or at least about 250% greater, or at least about 275% greater or at least about 300% greater than the $d_{10}$ of the talc feed material.

In certain embodiment, the $d_{90}$ of the talc agglomerate composition is at least about 5% greater than the $d_{90}$ of the talc feed material, for example, at least about 10% greater, or at least about 15% greater, or at least about 20% greater or at least about 25% greater, or at least about 30% greater, or at least about 35% greater. In certain embodiments, the $d_{90}$ of the talc agglomerate composition is no more than about 50% greater than the $d_{90}$ of the talc feed material, for example, no more than about 45% greater, or no more than about 40%, or no more than about 35% greater, or no more than about 30% greater, or no more than about 25% greater, or no more than about 20% greater, or no more than about 15% greater, or no more than about 10% greater than the $d_{90}$ of the talc feed material. In certain embodiments, the $d_{90}$ of the talc agglomerate composition is substantially unchanged compared to the $d_{90}$ of the talc feed material.

In certain embodiment, the $d_{95}$ of the talc agglomerate composition is at least about 5% greater than the $d_{95}$ of the talc feed material, for example, at least about 10% greater, or at least about 15% greater, or at least about 20% greater or, at least about 25% greater. In certain embodiments, the $d_{95}$ of the talc agglomerate composition is no more than about 40% greater than the $d_{95}$ of the talc feed material, for example, no more than about 35% greater, or no more than about 30%, or no more than about 25% greater, or no more than about 20% greater, or no more than about 15% greater, or no more than about 10% greater than the $d_{95}$ of the talc feed material. In certain embodiments, the $d_{95}$ of the talc agglomerate composition is substantially unchanged compared to the $d_{90}$ of the talc feed material.

In certain embodiments, the $d_{100}$ of the talc agglomerate composition is substantially unchanged compared to the $d_{100}$ of the talc feed material. In certain embodiments, the $d_{100}$ of the talc agglomerate composition is no more than about 4% greater than the $d_{100}$ of the talc feed material, for example, no more than about 3% greater, or no more than about 2% greater, or no more than about 1% greater, or no more than about 0.5% greater, or no more than about 0.1% greater than the $d_{100}$ of the talc feed material. In certain embodiments, the $d_{100}$ of the talc agglomerate composition is equal to the $d_{100}$ of the talc feed material.

In certain embodiments, the $d_{10}$ and $d_{50}$ of the talc agglomerate composition are both at least about 50% greater than the $d_{10}$ and $d_{50}$ of the talc feed material, the $d_{90}$ and $d_{95}$ of the talc agglomerate are, respectively, no more than about 40% and 35% greater than the $d_{90}$ and $d_{95}$ of the talc feed material, and the $d_{100}$ of the talc agglomerate composition is substantially unchanged compared to the $d_{100}$ of the talc feed material. For example, the $d_{10}$ of the talc agglomerate may be at least about 100%, or at least about 200%, or at least about 300% greater than the $d_{10}$ of the talc feed material. The $d_{50}$ of the talc agglomerate composition may be at least about 80%, or at least about 100% greater than the $d_{50}$ of the talc feed material.

In certain embodiments, the talc agglomerate composition obtainable by the method of the third aspect of the present invention has a particle size distribution according to the talc agglomerate of the first and second aspects of the present invention.

Following the technical information described in this application, persons of skill in the art will be able to identify suitable conditions, e.g., amount and particle size distribution of talc feed material, type and amount of agglomerization agent, mixing conditions (e.g., duration and time of mixing), classification, and/or heat treatment, to obtain without undue burden a talc agglomerate composition according to the first, second and third aspects of the present invention.

The talc feed material has a particle size distribution which is finer relative to the talc agglomerate composition obtained therefrom in accordance with the methods described herein. In certain embodiments, the talc feed material has a $d_0$ of less than about 1 μm, and/or a $d_{10}$ of less than about 4 μm, and/or a $d_{50}$ of less than about 15 μm, and/or a $d_{90}$ of less than about 35 μm, and/or a $d_{95}$ of less than about 50 μm, and a $d_{100}$ of less than about 100 μm. In certain embodiments, the talc feed material has a $d_0$ of from about 0.4 to about 0.75 μm, and/or a $d_{10}$ of from about 2 to about 2.75 μm, and/or a $d_{50}$ of from about 8 to about 12 μm, and/or a $d_{90}$ of from about 25 to about 30 μm, and/or a $d_{95}$ of from about 32 to about 38 μm, and/or a $d_{100}$ of from about 85 to about 95 μm.

Preparation Method

In certain embodiments, combining the talc feed material and agglomerization agent, e.g., silicate binder, comprises mixing the talc feed material and agglomerization agent, e.g., silicate binder. The mixing may comprise agitation of the mixture of talc feed material and agglomerization agent. In certain embodiments, the agglomerization is combined with the talc feed material in the form of a dispersion, suspension or slurry, for example, an aqueous dispersion, suspension slurry. In certain embodiments, the agglomerization agent is an aqueous dispersion of a binder composition, for example, an aqueous dispersion of silicate binder composition, for example, an aqueous dispersion of an alkali metal silicate binder composition, for example, an aqueous dispersion of sodium and/or potassium silicate. In certain embodiments, an aqueous dispersion of sodium silicate binder is used to agglomerate the talc feed material. In other embodiments, an aqueous suspension of potassium silicate binder is used to agglomerate the talc feed material. Based on the total weight of the dispersion, suspension or slurry, the amount of agglomerization agent, e.g., silicate binder, present may range from about 1 to about 60% by weight (with the balance water), for example, from about 10 to about 60% by weight, or from about 15 to about 55% by weight, or from about 20 to about 50% by weight, or from about 25 to about 45% by weight, or from about 30 to about 40% by weight, or from about 35 to about 45% by weight.

Based on the weight of talc, the agglomerization agent may be present in the talc agglomerate composition in an amount ranging from about 1 to about 40% by weight, for example, from about 5 to about 30% by weight, or from about 5 to about 25% by weight, or from about 5 to about 20% by weight, or from about 5 to about 15% by weight, or from about 5 to about 12% by weight, or from about 1 to about 10% by weight, or from about 1 to about 8% by weight, or from about 1 to about 6% by weight, or from about 1 to about 4% by weight. In certain embodiments, the agglomerization agent is present in an amount of at least about 1.5% by weight, based on the weight of talc, for example, at least about 2% by weight.

As described above, in certain embodiments, the talc feed material and agglomerization agent are combined in the presence of a water. The amount of water may be in the range of from about 1 to about 50 wt. % weight, based on the weight of talc, for example, from about 5 to about 50 wt. %, or from about 10 to about 50 wt. %, or from about 1 to about 40% by weight, of from about 1 to about 30% by weight, or from about 1 to about 25% by weight, or from about 1 to about 20% by weight, or from about 1 to about 15% by weight, or from about 2 to about 15% by weight, or from about 4 to about 15% by weight, or from about 6 to about 15 wt. %, or from about 8 to about 15 wt. %, or from about 4 to about 12% by weight, or from about 2 to about 10% by weight, or from about 4 to about 10% by weight. In certain embodiments, water is present in an amount of at least about 1.5% by weight, based on the weight of talc, for example, at least about 2% by weight, or at least about 3% by weight, or at least about 4% by weight.

In certain embodiments, the amount of aqueous dispersion of agglomerization agent is such that the talc agglomerate composition comprises from about 1 to about 20% by weight agglomerization agent and (prior to drying) from about 1 to about 20 wt. % water, for example, from about 1 to about 15% by weight agglomerization agent and (prior to drying) from about 1 to about 15% by weight water, or from about 2 to about 12 wt. % agglomerization agent and (prior to drying) from about 2 to about 12 wt. % water.

In certain embodiments, the aqueous dispersion of agglomerization agent and talc feed material are mixed sufficiently to at least substantially uniformly distribute the aqueous dispersion of agglomerization agent among the agglomeration points of contact of the talc feed material. In some embodiments, the combination of agglomerization and talc feed material are mixed with sufficient agitation to at least substantially uniformly distribute the aqueous dispersion of agglomerization agent among the agglomeration points of contact of the talc feed material. Any suitable mixing means may be used to mix and agitate the combination of agglomerization agent and talc feed material. The mixing means may be any conventional mixer apparatus which is suitable for mixing the talc feed material and agglomerization agent. An exemplary mixer is an Eirich RV02E intensive mixer (Maschinenfabrik Gustav Eirich GmbH & Co KG). Another exemplary mixer is a Hobart N-50 food mixer (Hobart, Troy, Ohio). In some embodiments, mixing includes low-shear mixing, for example, using a ribbon blender. In other embodiment, mixing includes high-shear mixing, for example, using a turbulizer.

In certain embodiments, mixing is carried for a period of from about 5 minutes to about 3 hours, for example, for less than about 2 hours, or less than about 1 hours, or from about 5-45 minutes, or from about 10-30 minutes, or from about 10-20 minutes.

In certain embodiments, mixing is carried out a room temperature (i.e., from about 20° C. to about 23° C. In other embodiments, mixing is carried out at a temperature of from about 20° C. to about 50° C., for example, from about 20° C. to about 40° C., or from about 20° C. to about 30° C.

In certain embodiment, combining the aqueous dispersion of agglomerization agent and talc feed material comprises, includes or consists of spraying the talc feed material with the aqueous dispersion of agglomerization agent, e.g., silicate binder composition. The spraying may be intermittent or may be continuous. In some embodiments, spraying includes mixing the talc feed material while spraying with the aqueous dispersion of agglomerization agent, for example, to expose different agglomeration points of contact to the spray. In such embodiments, the mixing may be intermittent or continuous.

Following the agglomerization of talc particles in the talc feed material, the talc agglomerate composition may be subjected to at least one classifying step. For example, before and/or after at least one heat treatment step, in some embodiments, the talc agglomerate composition may be subjected to at least one classification step. In some embodiments, the particle size distribution of the talc agglomerate composition is adjusted to suitable or desired size using any one of several techniques well known in the art. In some embodiments, the talc agglomerate composition is subjected to at least one mechanical separation to adjust the particle size distribution. Appropriate mechanical techniques include, but are not limited to, milling, grinding, screening, extrusion, triboelectric separation, liquid classification, aging, and air classification.

In some embodiments, the talc agglomerate is screened using an appropriately sized screen, for example, mesh screen. Screening may be carried out after agglomerization and prior to heat treatment. Alternatively, screening may be carried out after agglomerization and after heat treatment.

In some embodiments, heat treatment comprising heating the agglomerized material at a temperature suitable to dry the talc agglomerate composition. In some embodiments, heating is carried out at a temperature above about 100° C., for example, equal to or greater than about 110° C., or equal to or greater than about 120° C., or equal to or greater than about 130° C., or equal to or greater than about 140° C., or equal to or greater than about 150° C., or equal to or greater than about 160° C., or equal to or greater than about 170° C., or equal to or greater than about 180° C. Typically, the temperature of the heat treatment may not exceed about 300° C., for example, not exceed about 250° C., or not exceed about 200° C. The heat treatment may be carried for a suitable period of time to dry the talc agglomerate composition. For example, the talc agglomerate composition may be heated may be heated for a period of up to about 24 hours, for example, up to about 20 hours, or up to about 16 hours, or up to about 12 hours, or up to about 8 hours. In some embodiments, the heat treatment is carried for at least about 1 hour, for example, at least about 2 hours, or at least about 4 hours.

Depending on whether the talc agglomerization is subjected to a heat treatment, screening may be wet or dry screening. In some embodiments, the talc agglomerate is wet-screened, i.e., prior to heat treatment. In other embodiments, the talc agglomerate is dry screened, i.e., after heat treatment. In yet further embodiments, the talc agglomerate is wet-classified, e.g., wet-screened, heat treated, and then subjected to a further classification step, e.g., dry screening, dry milling, or air classifier.

In some embodiments, the screen (wet or dry) has a mesh size (US) ranging from about 50 to about 550, for example, from about 70 to about 400, for example, from about 80 to about 400. In some embodiments, the screen is a 70 mesh, or an 80 mesh, or a 100 mesh, or a 120 mesh, or a 140 mesh, or a 170 mesh, or a 200 mesh, or a 230 mesh, or a 270 mesh, or a 325 mesh, or a 400 mesh. A concordance between US mesh, Tyler sieve, BS sieve, and opening in microns is found in Table 1 below.

TABLE 1

Sieve Size Conversion Chart

| US Mesh | Tyler | British standard | Opening (microns) |
|---|---|---|---|
| 20 | 20 | 18 | 840 |
| 25 | 24 | 22 | 710 |
| 30 | 28 | 25 | 590 |
| 35 | 32 | 30 | 500 |
| 40 | 35 | 36 | 420 |
| 45 | 42 | 44 | 350 |
| 50 | 48 | 52 | 297 |
| 60 | 60 | 60 | 250 |
| 70 | 65 | 72 | 210 |
| 80 | 80 | 85 | 177 |
| 100 | 100 | 100 | 149 |
| 120 | 115 | 120 | 125 |
| 140 | 150 | 150 | 105 |
| 170 | 170 | 170 | 88 |
| 200 | 200 | 200 | 74 |
|  |  | 240 | 66 |
| 230 | 250 |  | 62 |
| 270 | 270 |  | 53 |
| 325 | 325 |  | 44 |
| 400 |  |  | 38 |
| 550 |  |  | 25 |
| 635 |  |  | 20 |
| 1000 |  |  | 13 |
| 1200 |  |  | 10.2 |
| 2300 |  |  | 6 |

In certain embodiments, the talc agglomerate composition is subject to a heat treatment, e.g., dried, and then classified by an air classifier. In certain embodiments, the dried talc agglomerate composition is subjected to screening before air classification. Commercially available air classifiers are well known to person skill in the art and typical comprise a high speed classifier wheel. For example, a lab scale Alpine™ 50 ATP classifier (available from Micron Powder Systems, Summit, N.J.) may be used. An exemplary classifier comprises one or more horizontally mounted high speed classifying wheels and a classifying air outlet. The classifying air injected into the machine base flows inwards through the classifying wheel and discharges relatively fine material, whereas the relatively coarse particles rejected by the classifying wheel leave the classifier through a coarse material outlet. Parameters such as classifier wheel speed and air flow pressure may be optimized to achieve desired products. Examples of typical parameters for an air classifier, for example, the Alpine™ 50 APT classifier, include: classifier wheel speed from about 2000 to 4000 rpm, for example, from about 2400 to about 300 rpm, and total air flow pressure from about 40 to about 60 CFM (Cubic Feet per Minute), for example, from about 45 to about 55 CFM, for example, from about 50 to about 55 CFM. Typically, the fine fraction collected in the cyclone is the product and coarse fraction collected in the separator is a by-product or waste when coarse particles are removed.

Any particles deemed to be over sized (which may be talc agglomerates) following classification may be subjected to a particle size reduction step (e.g., by grinding or milling) and then returned to the classifier for classification. In some embodiments, the classification process uses a close-loop system with a mill to grind over size particles which are returned to the classifier for classification.

In certain embodiments, following agglomerization of the talc particles, and optionally following any classification or screening stage, the talc agglomerate compositions may be subjected to a washing process. The purpose of said washing process may be, for example, to remove any excess or residual agglomerization agent. For example, the washing process may be to wash off any residual electrolytic binder.

The washing process may be carried out with any suitable washing composition, preferably a non-electrolytic washing composition. For example, the washing process may be carried out using de-ionised water as the washing composition.

Compositions and Uses

The talc agglomerate compositions of the present invention may be used as filler in a functional composition. As used herein, the term "functional composition" means a composition of matter which is formulated to meet the needs of a specific application, e.g., a paint or a coating composition.

In certain embodiments, the talc agglomerate composition is used as an extended filler, for example, to supplement or supplant other filler materials, which may be more expensive or more difficult to incorporate into the functional composition.

In certain embodiments, the talc agglomerate is used as a functional filler in a functional composition, for example, to modify, enhance of otherwise modulate one or more physical, mechanical or optical properties of the functional composition.

The functional composition comprising the talc agglomerate composition may be a paint, a polymer composition or a coating composition.

In certain embodiments, the functional composition is a coating composition, for example, an epoxy-based coating composition. The epoxy-based composition may be a marine coating, i.e., a coating which is formulated to be suitable in marine applications. The epoxy-based coating may be suitable for coating metal, fibreglass, concrete or wood, i.e., the coating is formulated such that is suitable for coating metal, fibreglass, concrete or wood. In certain embodiments, the epoxy-based coating is a coating for iron, steel, galvanised steep or aluminium.

The coating composition, for example, epoxy-based coating composition may be formulated for application by brush, pad, roller or by spraying.

The functional composition may comprise from about 0.1 to about 70 wt. % by weight of talc agglomerate composition, based on the total weight of the functional composition, for example, from about 1 to about 60% by weight, or from about 5 to about 50% by weight, or from about 10 to about 40% by weight, from about 20 to about 30% by weight of the talc agglomerate composition.

Paint compositions typically comprise primary pigment, optional extender pigment, solvent and binder, and other optional additives suitable for use in paint, as well as the talc agglomerate composition of the present invention.

A primary pigment is that which provides the primary colouration of a paint, whether white or a colour shade. The term includes finely ground, natural or synthetic, inorganic or organic, insoluble dispersed particles which, when dispersed in a liquid vehicle, i.e., solvent, may provide, in addition to colour, many of the desired properties of paint, such as opacity, hardness, durability and corrosion resistance. Extender pigments are the filler used in paints. Extender pigments generally do not hide as well as primary pigments and their presence may affect the overall characteristics and performance of a paint. Primary pigment is generally more expensive than extender pigment.

Suitable primary pigment include, but are not limited to, titanium dioxide, carbon black, calcium sulphate, iron oxide, and the copper-complex phthalo blue. Other suitable primary pigments for providing colour will be readily apparent to persons skilled in the art.

Extender pigments include, but are not limited to, an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, and natural or synthetic silica or silicates. The paint composition may include one or more or a mixture of the aforementioned extender pigments.

The paint may be formulated as a decorative paint, including matt and gloss paints, an industrial paint, including protective paints and paints for sanitation, and the like, and other paints such as paints for identification, e.g., signage, and the like.

The paint composition may be formulated for application to a variety of different materials, such as metal, wood, fibreglass, concrete or plastic.

The solvent is any suitable substance which can act as a carrier for the pigment and binder. Once on the substrate being painted, the solvent evaporates through drying and/or curing and leaves behind a dry paint film on the painted substrate. In one embodiment, the solvent comprises water and optional dispersing chemicals. Organic solvents include mineral spirits, e.g., white sprits, petroleum distillate, esters, glycol ethers, and the like.

The paint composition may be formulated for application by brush, pad, roller or by spraying.

Polymer compositions are many and various. The polymer composition may comprise any natural or synthetic polymer or mixture thereof. The polymer may, for example, be thermoplastic or thermoset. The term "polymer" used herein includes homopolymers and/or copolymers, as well as crosslinked and/or entangled polymers.

Polymers, including homopolymers and/or copolymers, comprised in the polymer composition of the present invention may be prepared from one or more of the following monomers: acrylic acid, methacrylic acid, methyl methacrylate, and alkyl acrylates having 1-18 carbon atoms in the alkyl group, styrene, substituted styrenes, divinyl benzene, diallyl phthalate, butadiene, vinyl acetate, acrylonitrile, methacrylonitrile, maleic anhydride, esters of maleic acid or fumaric acid, tetrahydrophthalic acid or anhydride, itaconic acid or anhydride, and esters of itaconic acid, with or without a cross-linking dimer, trimer, or tetramer, crotonic acid, neopentyl glycol, propylene glycol, butanediols, ethylene glycol, diethylene glycol, dipropylene glycol, glycerol, cyclohexanedimethanol, 1,6 hexanediol, trimethylolpropane, pentaerythritol, phthalic anhydride, isophthalic acid, terephthalic acid, hexahydrophthalic anyhydride, adipic acid or succinic acids, azelaic acid and dimer fatty acids, toluene diisocyanate and diphenyl methane diisocyanate.

The polymer may be selected from one or more of polymethylmethacrylate (PMMA), polyacetal, polycarbonate, polyvinyls, polyacrylonitrile, polybutadiene, polystyrene, polyacrylate, polyethylene, polypropylene, epoxy polymers, unsaturated polyesters, polyurethanes, polycyclopentadienes and copolymers thereof. Suitable polymers also include liquid rubbers, such as silicones.

The functional compositions of the present invention can be made by any suitable mixing method known in the art, as will be readily apparent to one of ordinary skill in the art.

Such methods include dry blending of the individual components and subsequent processing in a conventional manner. Certain of the ingredients can, if desired, be pre-mixed before addition to the mixture.

In the case of thermoplastic polymer compositions, such processing may comprise melt mixing, either directly in an extruder for making an article from the composition, or pre-mixing in a separate mixing apparatus. Dry blends of the individual components can alternatively be directly injection moulded without pre-melt mixing.

The paint compositions of the present invention may be prepared in accordance with conventional methods known in the art. This comprises combining, e.g., mixing, and processing paint components in appropriate amounts (depending on the desired paint composition) and under suitable conditions to obtain a paint composition. The paint components may be processed by milling or in a high-speed dispersion tank in which the premixed components are subjected to high-speed agitation by a circular, toothed blade attached to a rotating shaft. The processed composition is then typically thinned by agitation with a suitable amount of solvent for the type of paint desired to produce the final paint product.

The functional composition can be prepared by mixing of the components thereof intimately together. The said talc agglomerate composition may then be suitably blended, e.g., dry blended, with the mixture of components and any desired additional components, before processing to form a final functional composition.

EXAMPLES

Example 1

Preparation of Talc Agglomerate Composition 20 g of sodium silicate binder (provided at 37.6 wt % sodium silicate) was dispersed in 40 g of water and the slowly added to 280 g of a talc feed material. The talc feed material had a particle size distribution as shown in Table 2 below. The talc feed material had a Hegman value of 3.5 (determined in accordance with the method described above). After mixing for 15 minutes, the mixture was brushed through a 100 mesh screen with a 149 micron opening. After drying in a 150° C. oven overnight, the material was brushed through 325 mesh screen with a 45 micron opening. The talc agglomerate composition had a particle size distribution as shown in Table 2 below. The talc agglomerate composition had a Hegman value of 3.0.

TABLE 2

| Sample | $d_0$ | $d_{10}$ | $d_{50}$ | $d_{90}$ | $d_{95}$ | $d_{100}$ | sd | sd/$d_{50}$ |
|---|---|---|---|---|---|---|---|---|
| Feed | 0.58 | 2.46 | 9.91 | 27.92 | 34.95 | 88.00 | 10.17 | 1.03 |
| Agglomerated talc | 1.95 | 8.35 | 21.93 | 37.73 | 44.73 | 88.00 | 11.34 | 0.52 |

Figure 1:
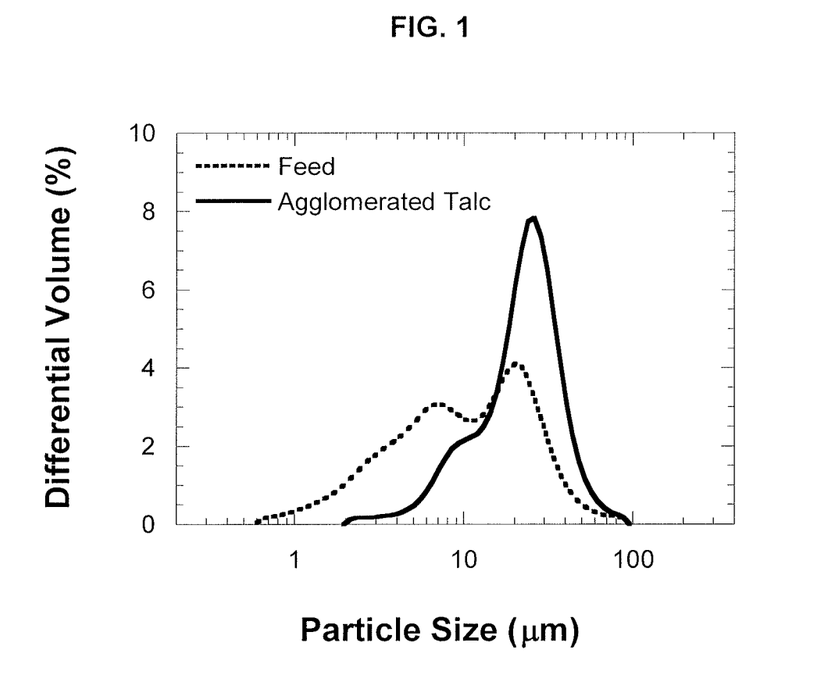
FIG. 1 is a graph showing the particle size distribution of a talc feed material and talc agglomerate composition prepared in the Examples.
Figure 2:
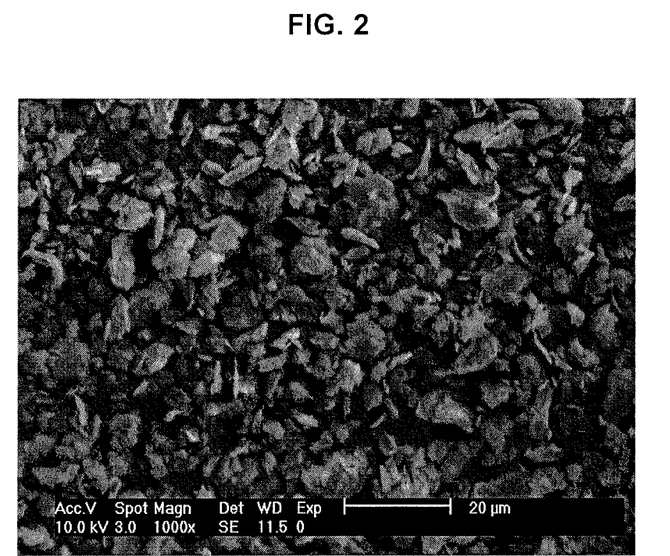
FIG. 2 is a scanning electron micrograph of an exemplary talc feed material.
Figure 3:
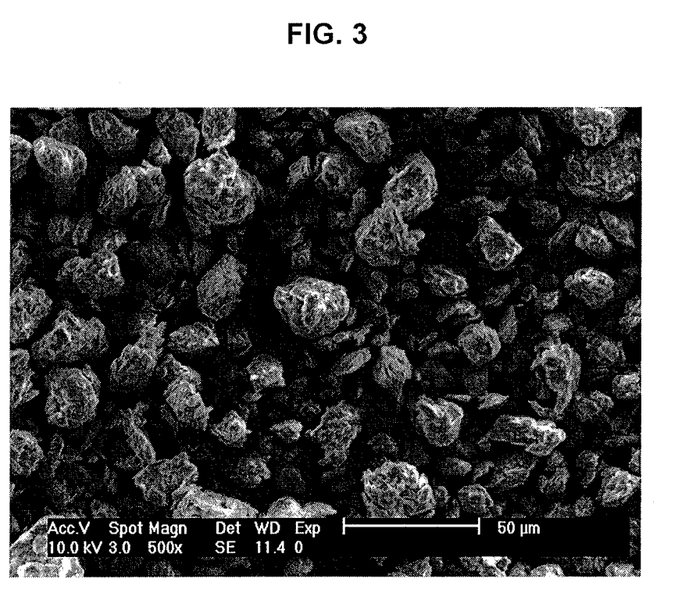
FIG. 3 is a scanning electron micrograph of a talc agglomerate composition prepared from the talc feed material shown in FIG. 2.

The particle size distribution of the talc feed material and talc agglomerate composition is shown in FIG. 1. SEM micrographs (see FIGS. 2, 3 and 4) indicate that ultrafine, platy particles in the feed material (FIG. 2) are agglomerated to form large (more rounded) particles (FIGS. 3 and 4) similar to the size of the larger particles in the feed material.

The talc feed material had a Tapped Bulk Density of 41.2 lbs/ft³ and a Loose Bulk Density of 19.4 lbs/ft³. The talc agglomerate composition had a Tapped Bulk Density of 64.2 lbs/ft³ and a Loose Bulk Density of 38.1 lbs/ft³. Tapped and Loose Bulk Density was determined in accordance with the method described above.

40 g or 100 g of talc samples (feed material and talc agglomerate composition) were mixed in 140 g of vegetable oil at a speed of 1500 rpm for 5 minutes. The viscosity of each sample was measured using a BYK Gardner KU-1+ Viscometer. Results are presented in Table 3 below.

Figure 4:
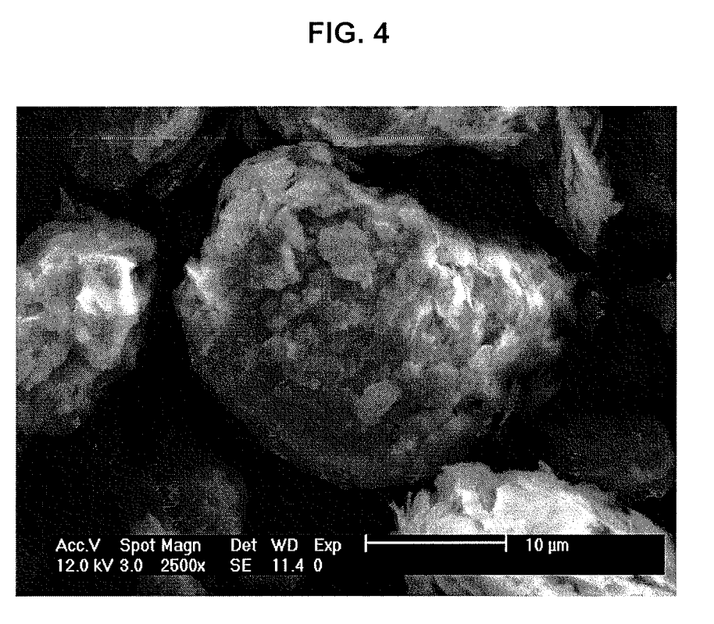
FIG. 4 is a higher magnification scanning electron of the talc agglomerate composition depicted in FIG. 3.
Figure 5:
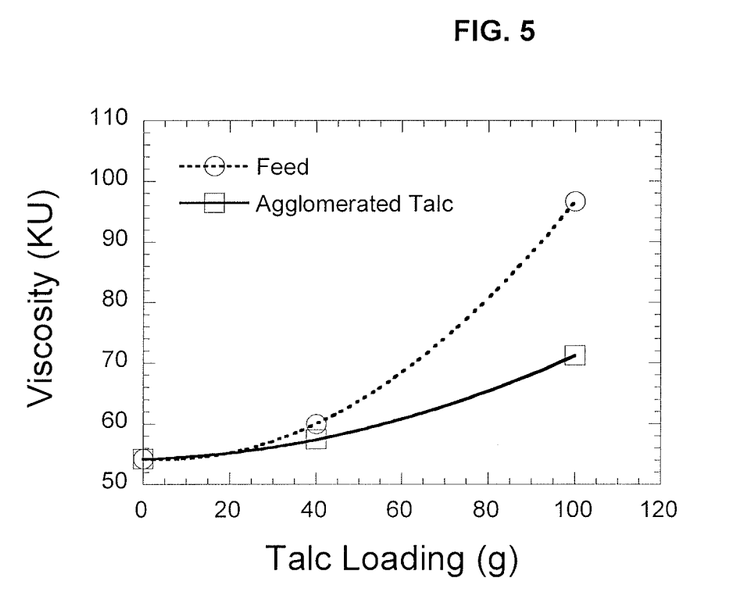
FIG. 5 is a graph showing variance in viscosity in oil of a talc feed material and talc agglomerate composition as talc loading increase.

FIG. 4 shows the effect of sample loading on viscosity. Viscosity difference between the feed material and the agglomerate talc increases with increasing sample loading. At 100 g loading viscosity of the agglomerated talc is about 26 lower compared to the feed material.

TABLE 3

| Sample | Weight(g) | Viscosity (KU) |
|---|---|---|
| Oil | 140 | 54.2 |
| Feed material | 40 (in 140 g oil) | 60.0 |
| Agglomerated talc | 40 (in 140 g oil) | 57.4 |
| Feed material | 100 (in 140 g oil) | 96.7 |
| Agglomerated talc | 100 (in 140 g oil) | 71.2 |

Example 2

The feed material and agglomerated talc samples prepared in Example 1 were compounded in an epoxy-based composition. The epoxy resin was a difunctional bisphenol A/epichlorohydrin derived liquid epoxy resin. Each sample consisted of 40 wt. % epoxy resin, 40 wt. % talc, 20 wt. % xylene. Measurement parameters and measured viscosity for each sample is summarized in Table 4.

TABLE 4

| | | Viscosity (KU) | |
|---|---|---|---|
| Sample | Spindle | 50 RPM | 100 RPM |
| Feed material | #3 | 3200 | 1902 |
| Agglomerated talc | #3 | 314 | 250 |

Example 3

A further series of samples were prepared in accordance with the method of Example 1, save that the amount of feed material, water and sodium silicate binder were varied (see Table 5). Physical data for the feed and test samples are summarized in Table 5. The data indicates that viscosity decreases linearly with increasing sodium silicate concentration.

TABLE 5

| Sample ID | Wt.(g) of feed | Water (g) | Sodium Silicate (g) | Water (%) | Sodium Silicate (%) |
|---|---|---|---|---|---|
| Agglomerate #1 | 1000 | 50 | 25 | 5 | 2.5 |
| Agglomerate #2 | 1000 | 100 | 50 | 10 | 5 |
| Agglomerate #3 | 500 | 50 | 35 | 10 | 7 |
| Agglomerate #4 | 3000 | 300 | 300 | 10 | 10 |

TABLE 6

| Sample ID | Loose Bulk Density (lbs/ft3) | Hegman | Viscosity (KU) |
|---|---|---|---|
| Talc feed | 22.7 | 3.5 | 96.7 |
| Agglomerate #1 | 20.2 | 4 | 92.9 |
| Agglomerate #2 | 27.4 | 3 | 86.0 |
| Agglomerate #3 | 29.3 | 3 | 81.7 |
| Agglomerate #4 | 35.1 | 3.25 | 72.6 |

Example 4

A further series of talc agglomerate samples were prepared from the talc feed material described in Example 1. Each sample was prepared on a Eirich RV02E intensive mixer (Maschinenfabrik Gustav Eirich GmbH & Co KG). 300 g of sodium silicate was dispersed in 300 g of water and then slowly added to 3000 g of talc feed material in the Eirich mixer. After mixing for 10 minutes, the mixture was dried in a 150° C. oven overnight. The dried material was then brushed through a 30 mesh screen with a 590 microns opening as the feed material for air classification. Classification conditions on a 50 ATP classifier are listed in the Table 7.

TABLE 7

| Sample ID | Yield (%) | Feedrate (kg/hr) | Classifier speed (rpm) | Air (CFM) |
|---|---|---|---|---|
| Test #1 | 83 | 7.08 | 3000 | 50 |
| Test #2 | 88 | 12.60 | 3000 | 55 |
| Test #3 | 74 | 25.54 | 2600 | 50 |
| Test #4 | 82 | 17.86 | 2600 | 50 |
| Test #5 | 90 | 12.66 | 2600 | 50 |
| Test #6 | 92 | 11.66 | 2400 | 50 |

Test results on the classified products (fine fraction) are summarized in Table 8.

TABLE 8

| Sample ID | Hegman | Viscosity in oil (KU) | Viscosity in epoxy (cP) | Loose Bulk Density (lb/cf) | $d_{10}$ | $d_{50}$ | $d_{90}$ | $d_{95}$ | sd | sd/$d_{50}$ |
|---|---|---|---|---|---|---|---|---|---|---|
| Feed material | 3.5 | 96.7 | 3200 | 22.7 | 2.46 | 9.91 | 27.92 | 34.95 | 10.17 | 1.03 |
| Test #1 | 3.5 | 69.2 | 286 | 36.6 | 5.88 | 18.11 | 35.14 | 45.10 | 10.98 | 0.61 |
| Test #2 | 3.5 | 68.6 | 250 | 38.1 | 5.91 | 18.41 | 38.33 | 50.58 | 11.97 | 0.65 |
| Test #3 | 3.25 | 66.6 | 211 | 41.9 | 7.27 | 19.75 | 35.13 | 42.75 | 10.52 | 0.53 |
| Test #4 | 3 | 67.0 | 230 | 40.0 | 7.54 | 20.90 | 43.44 | 56.72 | 12.97 | 0.62 |
| Test #5 | 3 | 66.8 | 250 | 39.2 | 6.65 | 19.56 | 36.02 | 44.86 | 11.17 | 0.57 |
| Test #6 | 2 | 67.2 | 242 | 39.6 | 7.49 | 21.09 | 41.14 | 51.28 | 12.58 | 0.60 |

Example 5

Preparation of Talc Agglomerate Compositions Using Non-Electrolytic Binders

A further series of talc agglomerate compositions were prepared from a dry-ground talc which has a $d_{10}$ of 2.55 μm, $d_{50}$ of 16.02 μm, $d_{90}$ of 40.97 μm and loose bulk density of 32.94 lb/ft³ ("talc feed material").

A talc control sample was prepared from the same dry-ground talc by air classification with very low yield to obtain a talc control sample which had a $d_{10}$ of 2.64 μm, $d_{50}$ of 19.82 μm, $d_{90}$ of 40.00 μm and loose bulk density of 54.35 lb/ft³ ("talc control material").

The talc agglomerate samples were prepared by dispersing binder in water at room temperature and then slowly adding the resultant mixture to 250 g of the talc feed material in a Hobart food mixture. The talc feed material had a Hegman value of between about 2 and about 3. After thorough mixing for 15 minutes, the mixture was dried in a 150° C. oven overnight and was then brushed through a 200 mesh screen with a 74 micron (μm) opening.

The different binders used are shown in Table 9 below.

TABLE 9

| Binder ID | Description |
|---|---|
| A | Polyacrylic acid |
| B | Ethyl silicate - a mixture of monomeric and various oligomeric and cyclic condensates of ethyl silicate with average chain length of approximately 5 Si—O units and reactive silicon dioxide content approximately 41% |
| C | Polyvinylpyrrolidone - MW of 1,300,000 |

The type of binder and the quantities of binder and water used in each sample is shown in Table 10 below.

TABLE 10

| Talc Agglomerate | Type of Binder | Feed (g) | Water (g) | Binder (g) | Water (%) | Binder (%) |
|---|---|---|---|---|---|---|
| Agglomerate #1 | A | 250 | 50 | 5 | 20 | 2 |
| Agglomerate #2 | B | 250 | 50 | 5 | 20 | 2 |
| Agglomerate #3 | C | 250 | 50 | 5 | 20 | 2 |
| Agglomerate #4 | A | 250 | 45 | 10 | 18 | 4 |
| Agglomerate #5 | B | 250 | 45 | 10 | 18 | 4 |
| Agglomerate #6 | C | 250 | 45 | 10 | 18 | 4 |
| Agglomerate #7 | A | 250 | 50 | 10 | 20 | 4 |
| Agglomerate #8 | B | 250 | 50 | 15 | 20 | 6 |
| Agglomerate #9 | C | 250 | 50 | 10 | 20 | 4 |
| Agglomerate #10 | B | 250 | 45 | 15 | 18 | 6 |
| Agglomerate #11 | C | 250 | 50 | 10 | 20 | 4 |

Viscosity of the talc agglomerate compositions was measured using a BYK Gardner KU-1+Viscometer. The viscosity samples were prepared by mixing 200 g of the talc feed material, talc control material or talc agglomerate composition in 150 g of vegetable oil. The results can be seen in Table 11 below. Viscosity of the talc agglomerate compositions was lower than the viscosity of the talc feed material, and was comparable with the viscosity of the talc control material from which the fines had been removed.

The loose bulk density of the talc feed material, talc control material and talc agglomerate compositions was also measured according to the method described above. The results are shown in Table 11 below. The increase in bulk density after agglomerization is consistent with the decrease in viscosity.

Conductivity was measured using a Fisher Scientific Accumet Model 20 pH/conductivity meter. The samples were prepared by adding 5 g of talc to 20 ml of distilled water in a 250 ml beaker and stirring for about one minute using a magnetic stirrer. 80 ml of water was then added to the solution and stirred for 30 seconds before the conductivity measurement was taken. The results are shown in Table 11 below. Agglomerates comprising binders A to C have a similar conductivity to the talc feed and control materials.

Hegman fineness of the talc feed and control materials and the talc agglomerate compositions was also measured according to the method described above. The test for measuring Hegman fineness is based on a ASTM D-1210-05 (2010). In a preferred method, 25 g of vegetable oil is provided. After adding 5 g of talc sample, the mixture is stirred for 15 to 30 seconds. When no dry powder is visually present, mixing speed is increased to the highest reasonable speed without splashing the sample and mixing is continued for at least 2 minutes. Using a spatula or glass rod, the dispersion is stirred manually. A small amount of dispersed sample is placed in the deep end of the path of the Hegman fineness gage (Precision Gage & Tool Co., Dayton, Ohio). By using a steel draw-down blade/scraper, the material is then drawn down the length of the path toward the shallow end of the gage with a uniform, brisk motion. The fineness reading, in Hegman units (0-8) is obtained by observing the point where the material first shows a definite speckled pattern. Typical fineness patterns described in the ASTM D 1210-05 (2010) procedure can be used for comparison. The results are shown in Table 11 below.

TABLE 11

| Talc Sample | Viscosity (KU) | Density (lb/ft³) | Conductivity (μS/cm) | Hegman |
|---|---|---|---|---|
| Talc Feed | >140 | 32.94 | 8.8 | 2 |
| Talc Control | 107.6 | 54.35 | 8.1 | 3 |
| Agglomerate #1 | 129.9 | 35.96 | 9.4 | 2¾ |
| Agglomerate #2 | >140 | 36.31 | 7.9 | 3¼ |
| Agglomerate #3 | 121.9 | 34.67 | 8.6 | 2¾ |
| Agglomerate #4 | 112.7 | 35.42 | 9.4 | 3¼ |
| Agglomerate #5 | >140 | 35.65 | 8.1 | 2¾ |
| Agglomerate #6 | 109.8 | 36.82 | 9.6 | 2½ |
| Agglomerate #7 | 101.8 | 36.88 | 9.4 | 1¼ |
| Agglomerate #8 | 102.7 | 40.21 | 7.6 | 1¾ |
| Agglomerate #9 | 98.2 | 35.82 | 8.9 | ½ |
| Agglomerate #10 | 105.9 | 38.44 | 7.5 | 1 |
| Agglomerate #11 | 99.4 | 41.53 | 9.3 | ¾ |

What is claimed is:

1. A talc agglomerate composition, said composition comprising agglomerated talc particles and an agglomerization agent, and having a conductivity of from about 1 to about 50 μS/cm;
   wherein the talc agglomerate composition has a sd/$d_{50}$ of from about 0.5 to about 0.7.

2. The talc agglomerate composition according to claim 1, wherein said agglomerization agent comprises a binder that is non-electrolytic.

3. The talc agglomerate composition according to claim 2, wherein the non-electrolytic binder is a polymer, and wherein said polymer comprises a monomer which has a side group comprising a carbonyl, carboxyl, amino or amide functional group.

4. The talc agglomerate composition according to claim 3, wherein said binder is selected from the group comprising polyacrylic acid, polyvinylpyrrolidone and polyacrylamide.

5. The talc agglomerate composition according to claim 2, wherein said non-electrolytic binder is a silicate binder.

6. The talc agglomerate composition according to claim 1, wherein the talc agglomerate composition has a $d_{90}$ of from about 15 to about 50 µm.

7. The talc agglomerate composition according to claim 1, wherein the agglomerization agent is present in an amount ranging from about 1 to about 40% by weight, based on the weight of talc.

8. The talc agglomerate composition according to claim 1, wherein the talc agglomerated composition has a Hegman value of 0.5 or more.

9. The talc agglomerate composition according to claim 1, wherein the talc agglomerate composition has a viscosity in oil of from about 50 KU to about 150 KU.

10. The talc agglomerate composition according to claim 1, wherein the talc agglomerate composition has a $d_{95}$ of from about 20 to about 60 µm.

11. A talc agglomerate composition, said composition comprising agglomerated talc particles and an agglomerization agent, and having a $d_{10}$ of from about 0.75 to about 20 µm.

* * * * *